Nov. 25, 1930.  F. A. BULLINGTON  1,782,395

ENGINE COMBUSTION CHAMBER

Original Filed March 10, 1927  2 Sheets-Sheet 1

INVENTOR
Frank A. Bullington
BY
Alfred R. Fuchs ATTORNEY

Nov. 25, 1930.  F. A. BULLINGTON  1,782,395
ENGINE COMBUSTION CHAMBER
Original Filed March 10, 1927  2 Sheets-Sheet 2

INVENTOR
Frank A. Bullington
BY
Alfred R. Fuchs ATTORNEY

Patented Nov. 25, 1930

1,782,395

UNITED STATES PATENT OFFICE

FRANK A. BULLINGTON, OF KANSAS CITY, MISSOURI, ASSIGNOR TO BULLINGTON ENGINE HEADS, OF KANSAS CITY, MISSOURI, A COMMON-LAW TRUST CONSISTING OF LOUIS R. ASH, HOWARD P. TREADWAY, AND FRANK A. BULLINGTON

ENGINE COMBUSTION CHAMBER

Application filed March 10, 1927, Serial No. 174,285. Renewed October 7, 1929.

My invention relates to internal combustion engines and more particularly to working fluid or fuel inlet, and combustion chamber means for internal combustion engines of the four stroke cycle type.

It is a purpose of my invention to provide means for supplying working fluid or fuel mixture to an engine cylinder with a minimum rise in temperature of the working fluid admitted during the period of intake action. This is of great advantage in increasing the efficiency of the engine, inasmuch as, ordinarily, in internal combustion engines such as now commonly known in the art, the fresh fluid charge is introduced into the cylinder through the combustion chamber space, where it mingles with the residual burned gas therein, being thereby heated to such an extent that it is greatly expanded in volume. This increase in volume is particularly great when the engine is operated at or near its full power capacity, as the temperature of the burned gas in the combustion chamber is then relatively high and the rise in temperature of the working fluid thus introduced is relatively great. The rise in temperature of the fluid filling the space within the cylinder as the same enters through the combustion chamber, causes said fluid to become less concentrated than would be the case if the same had not been raised in temperature, thus causing the introduction of a smaller amount of fluid into the cylinder than would be the case if the same had not been heated. This is partly offset by the increase in the combined capacity for fresh fluid charge of the cylinder and combustion chamber due to the cooling effect of the fresh fluid charge being mingled with the residual burned gas. The net loss of capacity for incoming fluid of the cylinder due to the heating of the fresh fluid charge by residual gas heat is, however, still a large percentage of the volumetric displacement of the piston, and the loss is greatly reduced by my means for introducing fluid into the cylinder forming the subject matter of this invention.

It is a further purpose of my invention, to provide means for introducing the fresh working fluid into the engine cylinder in such a manner that it is kept separate from the residual burned gas during the period of intake, in order to be mingled therewith during the period of compression action.

It is still a further purpose of my invention to provide for active mingling of the fresh working fluid or fuel mixture and the hot residual burned gas during the latter part of the compression stroke to reduce the work necessary for compression of the working fluid mixture, by utilizing said heat for increasing the compression pressure of the mixture, due to heating action thereof on said fresh fluid, particularly during the latter part of the compression stroke of the piston. In order to provide for the most thorough mingling of the fresh fluid and the hot residual burned gas, a main combustion chamber separate from the cylinder chamber but communicating therewith, is provided, the communicating passage between the combustion and cylinder chambers being restricted, whereby a condition of turbulence is set up in the combustion chamber as the fluid charge from the cylinder chamber is moved into said combustion chamber.

It is also an object of the invention to provide ignition means associated with the combustion chamber and passage leading from the same to the cylinder chamber, said means preferably comprising multiple ignition means for simultaneously igniting the compressed fuel charge at a plurality of points. In certain forms of the invention shown means is also provided for reducing the heat radiation losses from the engine combustion chamber, certain of said means also constituting means for absorbing the heat radiated from the combustion chamber during combustion and restoring the same to the combustion chamber wall during succeeding cooler periods within the combustion chamber.

In the forms of the invention shown in the drawings, the working fluid inlet means comprises an inlet chamber or passage leading into the cylinder chamber independently of the combustion chamber. Furthermore, means is preferably provided for deflecting the incoming fluid away from the entrance into the combustion chamber and directing the same toward the cylinder chamber. In all said forms, valved inlet and exhaust means for the engine are provided at the head end of the cylinder and at the side thereof, the principle involved being shown as being applied to various types of engines.

In all the forms of the invention shown, the engine is furthermore provided with a combustion chamber adapted to contain the major portion of the compression space for the cylinder which has a restricted opening to the cylinder, and is preferably of a spheroidal shape and closed at all times except for the passage leading to the cylinder chamber. Preferably the cylinder head is so constructed that substantially all the compression space is within said head, only mechanical clearance being provided between the head and the piston.

Other objects and advantages of the invention will appear as the description of the drawings proceeds. I desire to have it understood, however, that I do not intend to limit myself to the details of construction shown or described, but that I intend to include as part of my invention all such obvious changes and modifications as would occur to a person skilled in this art and as would fall within the scope of the claims.

Figure 2:
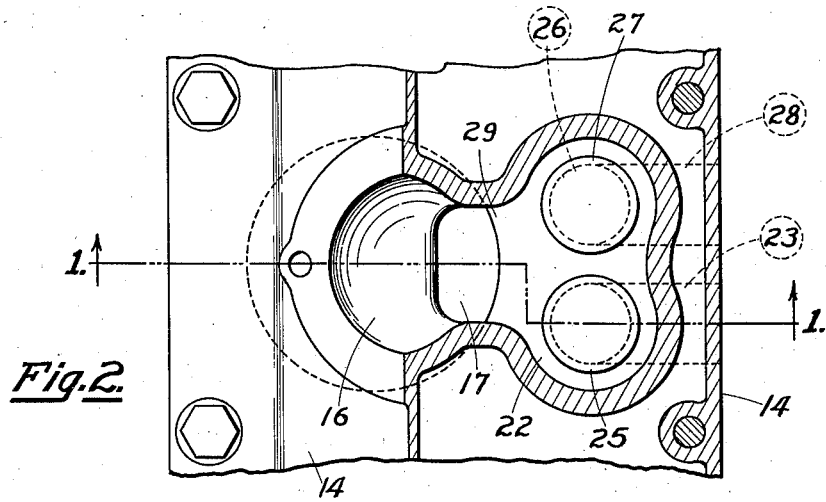
Fig. 2 is a fragmentary plan view, of the engine shown in Fig. 1, with a portion of the cylinder head removed and partly in section on the line 2—2 of Fig. 1.
Figure 1:
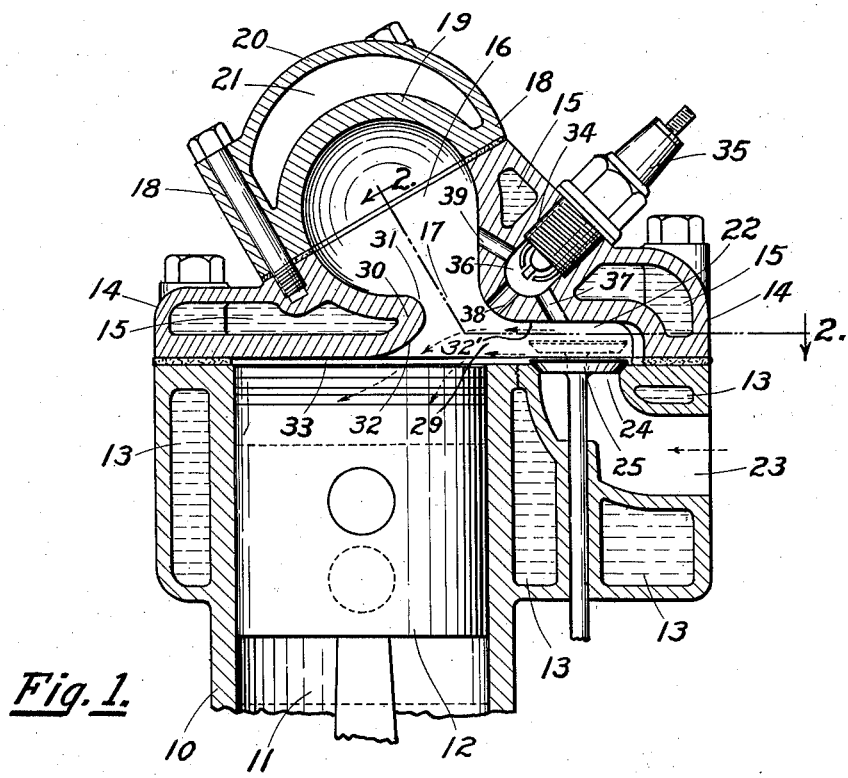
Fig. 1 is a vertical sectional view through the upper portion of an engine cylinder embodying my invention, the same being taken substantially on the line 1—1 of Fig. 2.

Referring in detail to the drawings, in Figs. 1 and 2, one form of my invention is shown, in which the cylinder 10 is shown as having a chamber 11 therein, in which the piston 12 operates. The cylinder 10 is provided with a water jacket having the spaces 13 provided therein for the circulation of a cooling medium, such as water. Mounted upon the cylinder 10 is a cylinder head 14 having spaces 15 therein for cooling medium.

The cylinder head member 14 is provided with a recessed portion 16 forming a main combustion chamber opening into the cylinder chamber 11 through the restricted passage 17. Preferably the head member 14 is provided with a detachable portion 18 forming a portion of the combustion chamber, and having an inner combustion chamber wall forming portion 19 and an outer wall portion 20 spaced therefrom to form a closed air space 21, therebetween. The wall portion 19 is preferably dome shaped, and the corresponding opposed portion of the head member 14 is shaped so that the resulting combustion chamber is spheroidal in form, which is the most desirable for rapid combustion within the same. The cylinder head member 14 is further provided with a valve pocket 22, which serves as an inlet passage connecting with the inlet passage 23 through the valve port 24, having an inlet valve 25 cooperating therewith. The valve pocket 22 is also provided with an exhaust port 26 controlled by the exhaust valve 27 leading to the exhaust passage 28, the chamber formed by the valve pocket 22 thus acting also as an exhaust passage. For the purpose of my invention, I prefer to make the valve pocket 22 of minimum volume capacity and only large enough to accommodate both the valves 25 and 27, and to provide a passage to and from the valves and the cylinder 11, through a relatively restricted portion 29, having a cross sectional area no less than that of the valve port 24 or 26.

The wall portion of the head member 14 opposite the passage thus formed, is provided with suitable means for directing the inflowing fluid toward the cylinder chamber 11 and away from the combustion chamber 16, said means being in the form of a deflector portion 30 having a sharply curved wall portion 31 adjacent the chamber 16 and a more gradually curved wall portion 32 adjacent the cylinder chamber 11. The resulting deflector directs the incoming fluid charge in the direction indicated by the arrows in Fig. 1. The flat wall portion 32' between the valve pocket 22 and the chamber 16 also deflects the incoming fuel away from the chamber 16 and toward the cylinder.

The valve pocket 22 overlaps the opening in the end of the cylinder as will be obvious from Fig. 1 and the head member 14 is provided with a substantially flat wall portion 33 forming an end wall for the cylinder having substantially only mechanical clearance from the piston 12 when the same reaches the upper limit of its movement.

The head member 14 is further provided with a spark plug receiving socket 34 screwthreadedly receiving the spark plug 35. The spark plug has its terminals located in the ignition chamber 36, from which the ignition propagation passages 37, 38 and 39 lead, respectively, to the valve pocket 22, the restricted passage 17 and the combustion chamber 16. Thus means is provided for igniting the charge at a plurality of points simultaneously.

Due to the arrangement of the fuel inlet means relative to the combustion chamber, the heating and expansion of the incoming fuel due to contact with the hot burned residual gas in the combustion chamber is avoided. Furthermore, due to the separated arrangement of the fuel charge and burned gas at the end of the intake stroke, the fuel charge is heated by the hot residual burned gas in the combustion chamber only during the compression stroke of said piston, and most appreciably during the latter part of the compression stroke. Due to the provision of the restricted passage 17, a condition of turbulence will be set up in the combustion chamber as the fuel charge is transferred to the same during the compression stroke. This causes a thorough mingling of the hot residual burned gas and said fuel charge, and causes a rapid rise in the temperature of the fuel charge, during the latter part of the compression stroke.

The total amount of useful work necessarily absorbed by the piston in compressing the fuel mixture is greatly reduced by my invention, as the fuel is confined under pressure when the hot residual burned gas in the combustion chamber 16 mingles therewith, and the heat then applied results in an increase in pressure within said fuel mixture. The mean effective pressure of the piston compression stroke is thereby reduced for any desired final compression pressure and the engine thereby made more powerful and efficient in proportion to such reduction.

Due to the provision of the air space 21, radiated heat, absorbed by the air therein, from a previous combustion of fuel mixture in the engine is transferred through the wall portion 19 to the fuel mixture within the combustion chamber, thus raising the temperature thereof and reducing the heat losses in the engine, which are a very big item in the thermal efficiency of the engine.

Figure 4:
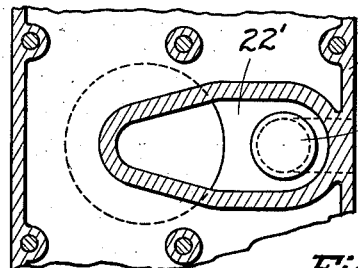
Fig. 4 is a fragmentary section taken substantially on the line 4—4 of Fig. 3.
Figure 3:
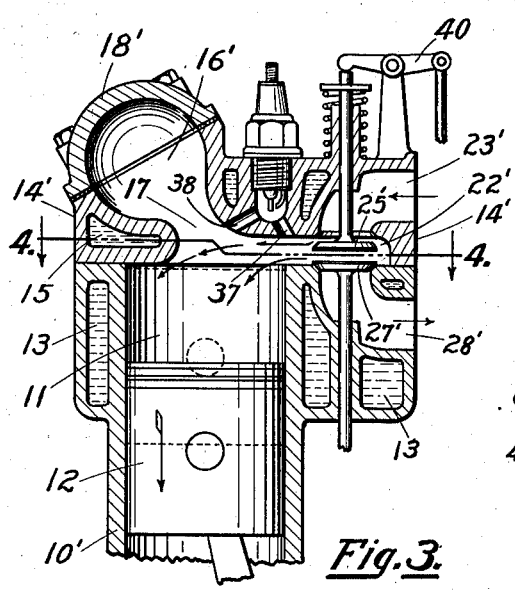
Fig. 3 is a view similar to Fig. 1 of a modified construction.

In Figs. 3 and 4 the construction of the engine is slightly modified and the air space above referred to its omitted. The cylinder 10' is constructed in a similar manner to that described above, but instead of both the inlet and exhaust passages and the corresponding valves being provided therein, only the exhaust passage is provided in said cylinder 10'. The exhaust passage 28' is provided with a valve 27' operating in the same manner as the valve 27 in Fig. 1. The cylinder head member 14', is, in this form, however, provided with an inlet passage 23', controlled by the valve 25', said passages 23' and 28' opening into the valve pocket 22' corresponding to the valve pocket 22 in Figs. 1 and 2, in substantially opposed relation to each other, the valves 25' and 27' being substantially opposite each other. This makes it unnecessary to provide an enlargement in the valve pocket to accommodate the valves, and makes it possible to reduce the amount of combustion space outside the main combustion chamber below that necessary in the form shown in Figs. 1 and 2, the passage from the valve pocket into the cylinder chamber 11 thus formed, being unrestricted, relative to said valve pocket. In this form of the invention the main combustion chamber 16' is shown as being provided with a single walled detachable portion 18'. The construction is otherwise the same as in Figs. 1 and 2, except that one of the ignition propagation passages is omitted, and overhead valve actuating means comprising a rocker arm 40 is provided for the valve 25'.

Figure 6:
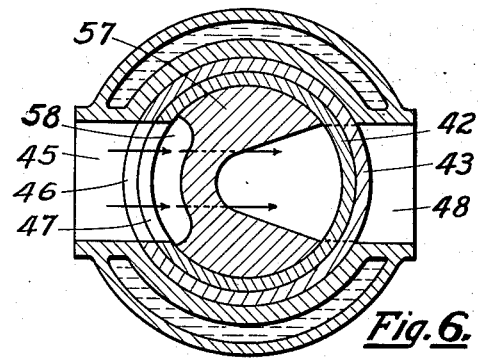
Fig. 6 is a section taken substantially on the line 6—6 of Fig. 5.
Figure 5:
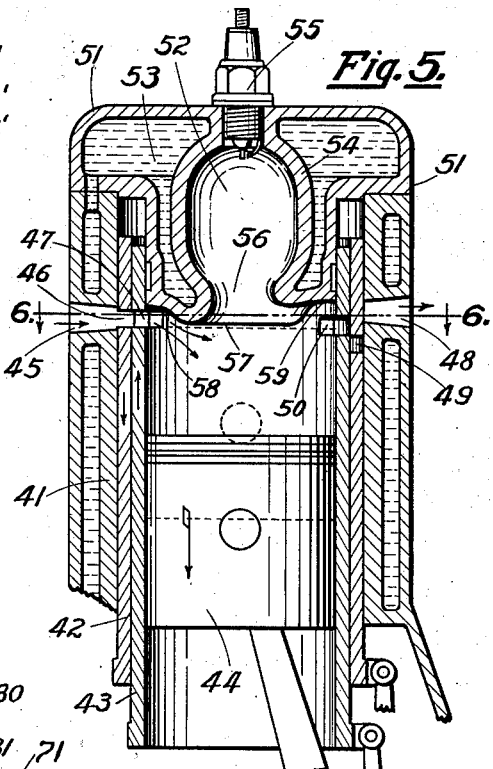
Fig. 5 is a view similar to Fig. 1 of a sleeve valve engine showing my invention applied thereto.

In Figs. 5 and 6, a sleeve valve engine is shown with my invention applied thereto. In said figures, the cylinder 41 is shown as having the valve sleeves 42 and 43 operating therein, and a piston 44 operating within the sleeve 43. The cylinder is provided with an inlet passage 45 with which the slots 46 and 47 in the valve sleeves are adapted to align to admit fuel to said cylinder 41. The cylinder is further provided with an exhaust passage 48 with which the slots 49 and 50 in the valve sleeves are adapted to align to exhaust the products of combustion from said cylinder. The cylinder is further provided with a head member 51 having a combustion chamber 52 of spheroidal form provided therein, said combustion chamber being separated from the cooling medium space 53 by the wall portion 54. Ignition means 55 is provided for the combustion chamber 52, and the latter communicates with the interior of the cylinder through the restricted passage 56. The cylinder head is further provided with an end wall forming portion 57 having only mechanical clearance from the piston 44 when the latter is in its position nearest the head. A depression 58 in the end wall 57 acts as a deflector for directing the incoming fuel toward the cylinder chamber and away from the combustion chamber 52. The wall portion 59 is spaced a greater distance from the piston 44 at the upward limit of its movement, to permit the unrestricted flow of the products of combustion toward the exhaust passage 48.

Figure 7:
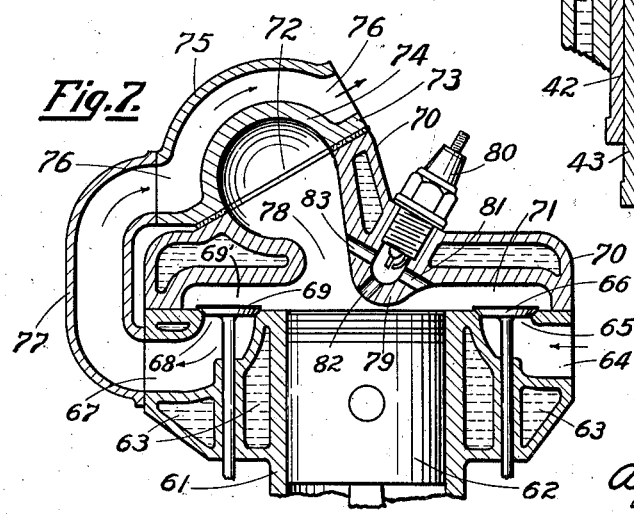
Fig. 7 is a fragmentary vertical sectional view of an engine of the T-head type showing my invention applied thereto.

In Fig. 7, the invention is shown as being applied to a "T-head" engine. In this form of the invention the cylinder 61 has the piston 62 operating therein in the usual manner, and is provided with spaces 63 for cooling medium. On one side of the cylinder the inlet passage 64 is provided having a port 65 controlled by the inlet valve 66, and on the opposite side the exhaust passage 67 is provided leading from the exhaust port 68 controlled by the exhaust valve 69 in the valve pocket 69'. The cylinder head member 70 is provided with an inlet valve pocket 71 that overlaps the cylinder chamber and into which the inlet valve 66 opens. The cylinder head member 70 is further provided with a main combustion chamber 72 formed partly within the main portion of the head member 70 and partly within the detachable member 73. Said detachable member 73 preferably has a dome shaped wall portion 74 forming the end wall of said combustion chamber, and a wall portion 75 spaced therefrom, to provide a passage 76 therebetween connected with the exhaust passage 67 through the tubular member 77. The exhaust gas is thus brought into contact with the wall portion 74 for heating purposes. A restricted passage 78 is provided leading from the combustion chamber 72 into the cylinder chamber, and a depending deflecting portion 79 is provided adjacent the valve pocket 71 for directing the incoming fluid toward the chamber within the cylinder and away from the entrance to the combustion chamber. The spark plug 80 corresponds to the plug 35 in Fig. 1 and the ignition propagation passages 81, 82 and 83 correspond to the ignition propagation passages 37, 38 and 39 in Fig. 1.

It will be noted that in all the forms the combustion chamber is provided with a restricted opening into the cylinder chamber and that the valve means controlling the inlet and exhaust are located near the head end of the cylinder and at the sides thereof. It will also be noted, that in the forms shown in Figs. 5, 6 and 7, the exhaust gases are passed out of the engine without entering any portion of the inlet passage.

Having thus described my invention, what I desire to claim and secure by United States Letters Patent is:

1. In an internal combustion engine, a cylinder, a cylinder head having a combustion chamber therein having restricted communication with said cylinder and adapted to contain the greater portion of the compression space for said cylinder, valved inlet and exhaust means at the head end of said cylinder and at the side thereof independent of said combustion chamber, and deflector means associated with said inlet means comprising a flat wall portion on said cylinder head between said inlet means and said combustion chamber.

2. In an internal combustion engine, a cylinder, a cylinder head having a combustion chamber therein, said cylinder head having a restricted passage therein leading from said chamber to said cylinder, said chamber being otherwise permanently closed, valved inlet and exhaust means at the head end of said cylinder and at the side thereof, and means for deflecting incoming fluid toward said cylinder and away from said combustion chamber.

3. In an internal combustion engine, a cylinder, a cylinder head having a combustion chamber therein and having therein a restricted passage leading from said cylinder and opening substantially tangentially into said chamber so that a condition of rotative turbulence is set up therein as fluid passes from said cylinder into said combustion chamber, and valved inlet means at the head end of said cylinder and at the side thereof, said cylinder head having a wall between said inlet means and said combustion chamber for deflecting the fluid entering through the inlet means away from said combustion chamber.

4. In an internal combustion engine, a cylinder head, said head having a combustion chamber therein, said head having a restricted passage therein leading from said combustion chamber and having a valve pocket therein separate from said combustion chamber, and means for substantially simultaneously initially igniting the contents of said combustion chamber and valve pocket.

5. In an internal combustion engine, a cylinder head having a combustion chamber therein, said head having a restricted passage therein leading from said combustion chamber and having a valve pocket therein separate from said combustion chamber, and means for igniting both the contents of said combustion chamber and said valve pocket, said combustion chamber being otherwise permanently closed.

6. In an internal combustion engine, a cylinder head having a combustion chamber therein, said head having a passage therein leading from said combustion chamber and having a valve pocket therein separate from said combustion chamber and opening into said passage and ignition means in said passage between said chamber and valve pocket.

7. In an internal combustion engine, a cylinder, a cylinder head having a recess therein extending to one side of said cylinder and overlapping the same to provide a valve pocket in said cylinder head at one side of said cylinder and a passage over said cylinder leading into the cylinder from said valve pocket, and said cylinder head having a secondary recess extending from said first mentioned recess and opening into the same over the cylinder, said secondary recess being permanently closed except for communication with said first mentioned recess, and ignition means in said cylinder head between said recesses.

8. In an internal combustion engine, a cylinder, a piston operating in said cylinder and a cylinder head having a recess therein extending to one side of said cylinder and overlapping the same to provide a valve pocket in said cylinder head at one side of said cylinder and a passage over said cylinder leading into the cylinder from said valve pocket, and said cylinder head having a secondary recess extending from said first mentioned recess and opening into the same over the cylinder, said secondary recess being permanently closed except for communication with said first mentioned recess, said cylinder head having a restricting wall portion overlying the cylinder on the side thereof remote from said valve chamber and extending to said first mentioned recess, said wall cooperating with said piston to restrict the application of initial combustion pressure thereto.

9. In an internal combustion engine, a cylinder, a cylinder head having a recess therein extending to one side of said cylinder and partially overlapping the same on one side thereof to provide a valve pocket in said cylinder head at one side of said cylinder and a passage over said cylinder leading into the cylinder from said valve pocket, said cylinder head having a secondary recess therein extending from said first mentioned recess and opening into the portion of the same overlapping the cylinder, said secondary recess being closed except for communication with said first mentioned recess, and ignition means in said cylinder head between said recesses.

10. In an internal combustion engine, a cylinder and a cylinder head having a recess therein extending to one side of said cylinder and partially overlapping the same on one side thereof to provide a valve pocket in said cylinder head at one side of said cylinder and a passage over said cylinder leading from said valve pocket into the adjacent side of said cylinder, said cylinder head having a secondary recess therein extending from said first mentioned recess and opening into the portion of the same overlapping the cylinder, said secondary recess being permanently closed except for communication with said first mentioned recess.

11. In an internal combustion engine, a cylinder and a cylinder head having a recess therein extending to one side of said cylinder and partially overlapping the same on one side thereof to provide a valve pocket in said cylinder head at one side of the cylinder and a passage over the cylinder leading from said valve pocket into the adjacent side of said cylinder, said cylinder head having a secondary recess therein extending from said first mentioned recess and opening into the portion of the same overlapping the cylinder adjacent the valve pocket forming portion thereof, said secondary recess being permanently closed except for communication with said first mentioned recess.

12. In an internal combustion engine, a cylinder, a cylinder head having a combustion chamber therein having restricted communication with said cylinder and adapted to contain the greater portion of the compression space for said cylinder, said combustion chamber being otherwise permanently closed, and said cylinder head having a valved fuel inlet pocket located at the head end of said cylinder and at the side thereof which is independent of said combustion chamber.

13. In an internal combustion engine, a cylinder, a cylinder head having a combustion chamber therein, ignition means associated therewith, said cylinder head having a restricted passage therein leading from said chamber to said cylinder, said combustion chamber being otherwise permanently closed, and said head having a valve pocket combustion chamber therein spaced from said first combustion chamber.

14. In an internal combustion engine, a cylinder head having a combustion chamber therein communicating with the cylinder through a restricted passage, said cylinder head having a fuel inlet chamber therein having independent communication with said cylinder, and means for substantially simultaneously igniting the contents of said combustion chamber, restricted passage and inlet chamber.

15. In an internal combustion engine, a cylinder head having a combustion chamber therein communicating with the cylinder through a restricted passage, said cylinder head having a fuel inlet chamber therein having independent communication with said cylinder, and means for substantially simultaneously igniting the contents of said restricted passage and inlet chamber.

16. In an internal combustion engine, a cylinder head having a combustion chamber therein, said head having a restricted passage therein leading from said combustion chamber and having a valve pocket therein separate from the said combustion chamber, said head having an ignition pocket therein and ignition means in said ignition pocket, said head having passages leading from said ignition pocket into said combustion chamber and valve pocket.

17. In an internal combustion engine, a cylinder head having a combustion chamber therein, said head having a restricted passage therein leading from said combustion chamber and having a valve pocket therein separate from the said combustion chamber, said head having an ignition pocket therein and ignition means in said ignition pocket, said head having passages leading from said ignition pocket into said combustion chamber, restricted passage and valve pocket.

18. In an internal combustion engine, a cylinder, a cylinder head having a combustion chamber therein, and having a restricted passage therein leading from said cylinder and opening substantially tangentially into said chamber, the wall of said chamber being concavely curved on the opposite side of said opening from that to which said passage is tangent, so that rotative turbulence is set up therein as fluid passes from said cylinder into said combustion chamber, and valved inlet and exhaust means in the head of said cylinder and at the side thereof and independent of said combustion chamber.

19. In an internal combustion engine, a cylinder, a cylinder head having a combustion chamber therein, said cylinder head having a restricted passage therein leading from said chamber to said cylinder, said combustion chamber being otherwise closed, ignition means in the wall of said restricted passage, a piston operating in said cylinder, said head having an end wall forming portion from which said piston has only mechanical clearance at the end of its stroke, and valved inlet and exhaust means at the head end of said cylinder and at the side thereof, said means being independent of said combustion chamber.

20. In an internal combustion engine, a cylinder head having a combustion chamber therein, said head having a restricted passage therein leading from said combustion chamber, said combustion chamber being otherwise permanently closed, said head having a valve pocket therein separate from said combustion chamber and an end wall portion on said head overlying the cylinder with which the head is associated, and having only mechanical clearance from the piston operating therein.

In testimony whereof, I hereunto subscribe my name this 7th day of March, 1927.

FRANK A. BULLINGTON.